Figure 5:
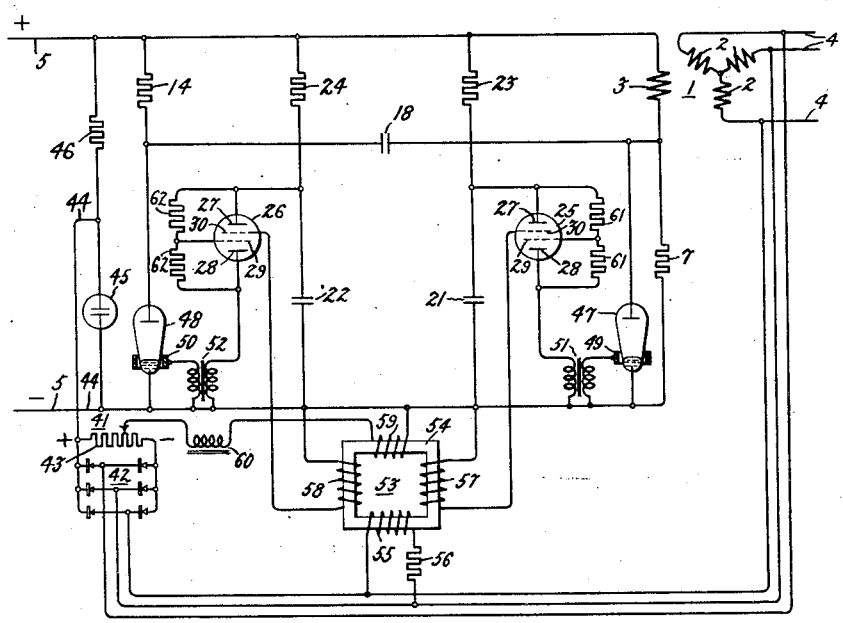

Nov. 5, 1940.　　　E. A. EDWARDS　　　2,220,755
ELECTRIC VALVE CIRCUIT
Filed June 22, 1938　　　4 Sheets-Sheet 1
Fig.1.
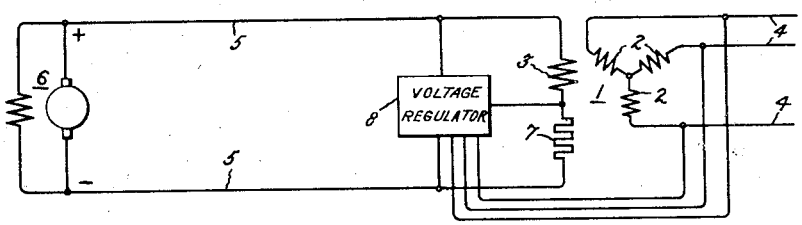
Fig.2.
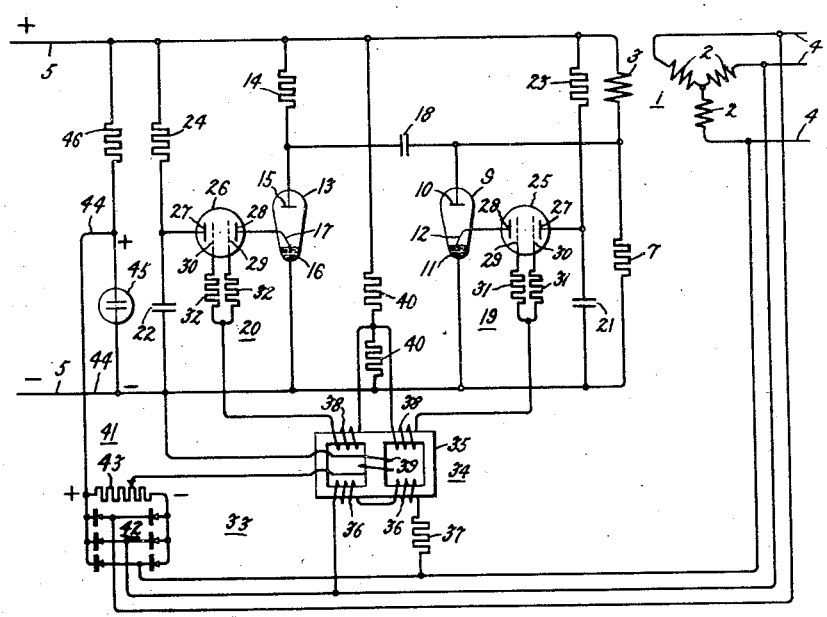
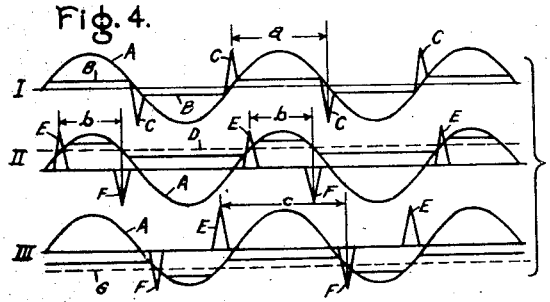
Fig.4.
Inventor:
Evan A. Edwards,
by Harry E. Dunham
His Attorney.

Inventor:
Evan A. Edwards,
by Harry E. Dunham
His Attorney.

Inventor:
Evan A. Edwards,
by Harry E. Dunham
His Attorney.

Nov. 5, 1940.       E. A. EDWARDS       2,220,755
ELECTRIC VALVE CIRCUIT
Filed June 22, 1938       4 Sheets-Sheet 4

Inventor:
Evan A. Edwards,
by Harry E. Dunham
His Attorney.

Patented Nov. 5, 1940

2,220,755

UNITED STATES PATENT OFFICE 2,220,755

ELECTRIC VALVE CIRCUIT

Evan A. Edwards, East Cleveland, Ohio, assignor to General Electric Company, a corporation of New York Application June 22, 1938, Serial No. 215,166

10 Claims. (Cl. 171—312)

My invention relates to electric valve circuits and more particularly to electric valve circuits for controlling dynamo-electric machines.

In the control of dynamo-electric machines, as for example, in excitation circuits for direct current and alternating current generators, it is frequently desirable to energize the field windings from sources of direct current. Furthermore, due to the rapidity of response and the flexibility of control of electric valve apparatus, it is desirable to effect control of the energization of the field windings by employing electric valves. One of the types of excitation circuits which has been found desirable is that regulating system which operates on the Tirrill principle and which employs electronic discharge devices or electric valves for controlling the energization of the circuit. Some of these circuits operate on the principle of alternate opening and closing of the electric valves for a variable number of successive cycles in a manner similar to the time-opened, time-closed effect of the vibratory contacts of a Tirrill type regulator. A system of the latter type is disclosed and claimed in United States Letters Patent No. 2,025,583 granted December 24, 1935 upon an application filed by Alan S. Fitzgerald and George W. Garman, and which is assigned to the assignee of the present application. When it is desired to apply this principle of the Tirrill type regulator to arrangements wherein the field circuit is energized from a source of direct current, it has been found necessary to devise improved control circuits in order to obtain the desired precision of control and regulation. In accordance with the teachings of my invention described hereinafter, I provide improved excitation circuits wherein electric valves operate in accordance with the Tirrill principle to effect excitation of an excitation circuit from a source of direct current.

It is an object of my invention to provide new and improved control circuits for electric valve apparatus.

It is another object of my invention to provide new and improved electric valve translating circuits.

It is a further object of my invention to provide new and improved electric valve excitation circuit for dynamo-electric machines.

In accordance with the illustrated embodiments of my invention, I provide new and improved electric valve circuits for effecting energization of the field winding of a dynamo-electric machine from a direct current source, and in which the electric valve apparatus simulates the operation of the vibratory contacts of a Tirrill type regulator. A resistance is connected in series relation with the field winding and is periodically short circuited or by-passed by an electric valve means which, when in the conducting condition, effects transmission of a larger amount of current to the field winding. The energization of the field winding is dependent upon, or is a function of the ratio of the period of conduction to the period of nonconduction of the electric valve means. In order to render the electric valve means alternately conductive and nonconductive and to control thereby the energization of the field winding in accordance with a predetermined controlling influence, such as the voltage of the machine, I provide a control circuit for rendering the electric valve means conductive and a means for commutating the current from the electric valve means. This commutating means comprises a second electric valve means which is also connected to be energized from the direct current circuit and includes a commutating capacitance which is connected between the anodes of the two electric valve means. When the second electric valve means is rendered conductive, current is commutated from the first electric valve means. The first electric valve means is rendered conductive periodically and the second electric valve means is rendered conductive at the same frequency as the first electric valve means but at a variable time between the times of initiation of conduction of the first electric valve means, thereby controlling the ratio of the period of conduction to the period of nonconduction of the first electric valve means.

In accordance with another feature of the embodiments of my invention diagrammatically illustrated, I provide improved control circuits whereby the ratio of the period of conduction to the period of nonconduction of the first electric valve means is controlled by producing periodic voltages variable in phase with respect to each other, and which are impressed on the control members of the two electric valve means. The phase displacement between the two periodic voltage determines the period of conduction of the first electric valve means and thereby controls the excitation of the field winding and hence the voltage of the dynamo-electric machine.

In accordance with a further feature of my invention diagrammatically illustrated in one of the embodiments of the invention, the second electric valve means is rendered conductive by means of a circuit which generates a periodic voltage by the charge and discharge of a capacitance, and in which an electric valve circuit superimposes on the periodic voltage a unidirectional biasing voltage to control the time at which the second electric valve means is rendered conductive.

Figure 3:
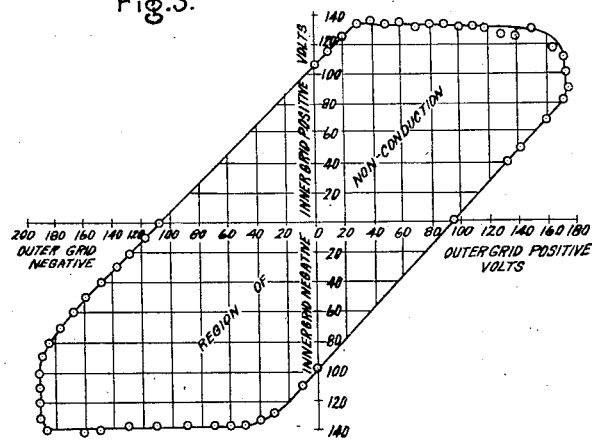
Figure 6:
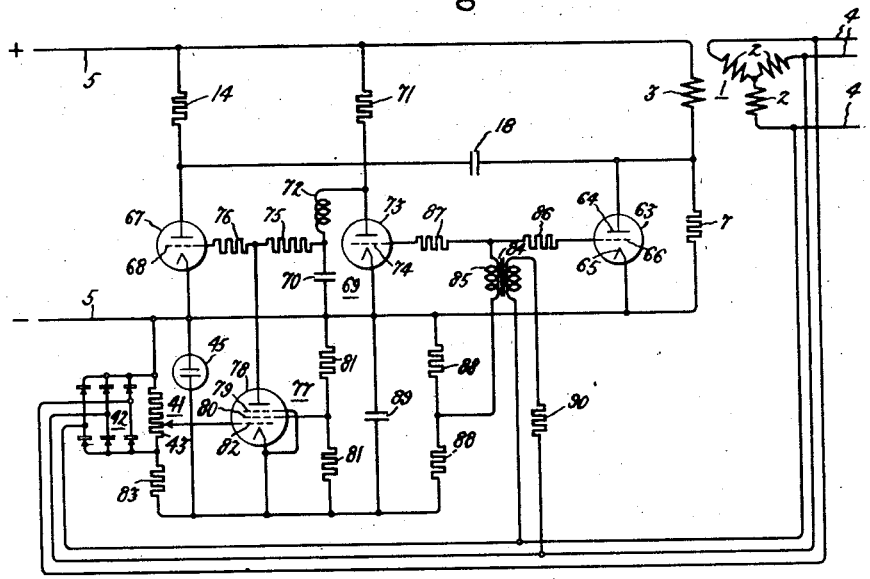
Figure 7:
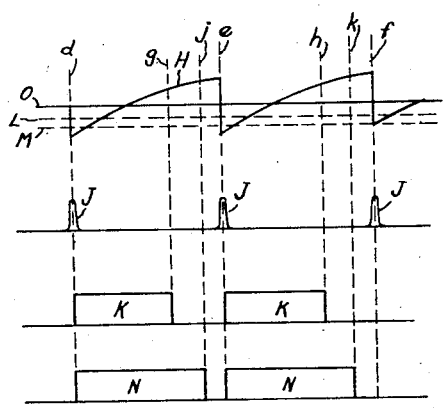
Figure 8:
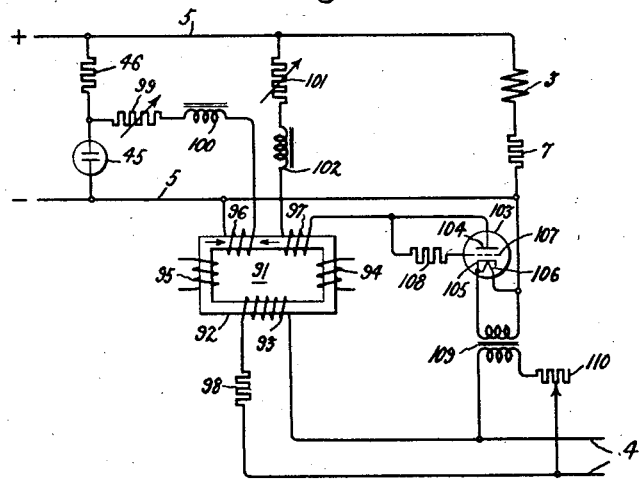
Figure 9:
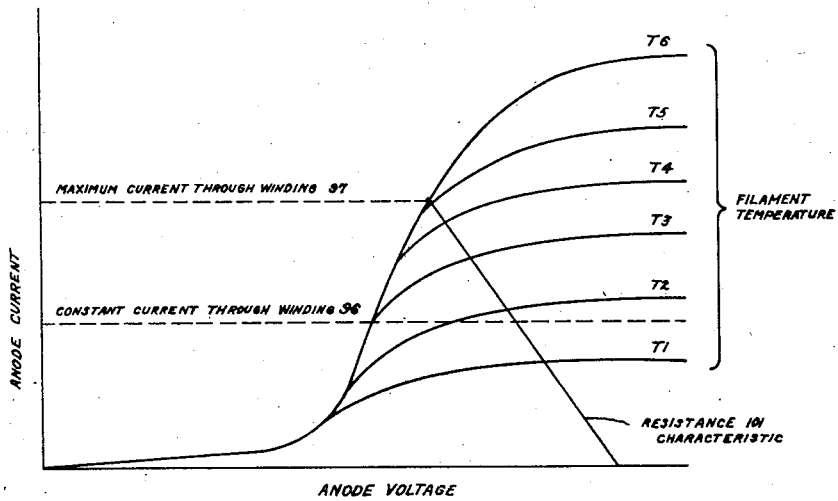

For a better understanding of my invention, reference may be had to the following description taken in connection with the accompanying drawings, and its scope will be pointed out in the appended claims. Fig. 1 is a simplified diagrammatic representation illustrating the general principle on which my invention operates; and Fig. 2 is a diagrammatic illustration of my invention as applied to an excitation circuit employing electric valve means having immersion-ignitor control members and which employs auxiliary control valves of the Strobotron type. Figs. 3 and 4 represent certain operating characteristics of the arrangement shown in Fig. 2. Fig. 5 represents diagrammatically another embodiment of my invention employing electric valves utilizing control members of the starting band type; Fig. 6 represents a still further embodiment of my invention in which an auxiliary circuit for generating a periodic electrical quantity controls the energization of the excitation circuit, and Fig. 7 represents certain operating characteristics of the arrangement shown in Fig. 6. Fig. 8 represents a further modification of my invention relating to an improved control circuit for saturable inductive devices, and Fig. 9 represents certain operating characteristics of the arrangement of Fig. 8.

Fig. 1 diagrammatically illustrates a simplified embodiment of my invention as applied to a regulating or controlling circuit for a dynamo-electric machine 1 which may be of the alternating current or of the direct current type. For the purpose of illustration, machine 1 is shown as being of the alternating current type having armature windings 2 and a field winding 3. The armature windings 2 may be connected to an alternating current circuit 4. A source of direct current 5 energizes the field winding 3. Circuit 5 may be energized from any suitable source, such as a self-excited direct current generator 6. A resistance 7 is connected in series relation with the field winding 3 and an electronic voltage regulator 8 is connected in shunt with the resistance 7. The voltage regulator 8 may be any of the arrangements described hereinafter and operates on the Tirrill principle; that is, it controls the energization of field winding 3 by periodically short circuiting the resistance 7. The energization of field winding 3 is controlled by controlling the ratio of the period of conduction to the period of nonconduction of electric valve apparatus which shunts the resistance 7.

Fig. 2 diagrammatically illustrates the electronic voltage regulator applied to the general system shown in Fig. 1. An electric valve means 9 is connected across the terminals of resistance 7 and controls the average value of the current transmitted to the field winding 3 by periodically short circuiting the resistance 7. The electric valve means 9 is preferably of the type employing an ionizable medium, such as a gas or a vapor, and comprises an anode 10, a cathode 11 and may include a control member 12 of the make-alive or immersion-ignitor type. The immersion-ignitor control member 12 is preferably of a material such as boron-carbide or silicon-carbide and establishes an arc discharge between the anode 10 and the cathode 11 when a sufficiently large current is transmitted to the control member.

As a means for rendering the electric valve 9 non-conductive, or, in other words, to effect commutation of current from the electric valve means 9, I provide a second electric valve means 13 which is connected to the direct current circuit 5 through an impedance element, such as a resistance 14. The electric valve means 13 is also preferably of the type employing an ionizable medium and includes an anode 15, a cathode 16 and an immersion-igniter control member 17. A capacitance 18 is connected between the electric valves 9 and 13 and serves to impress transient negative voltages on the anodes 10 and 15 of electric valves 9 and 13, respectively, to effect commutation of the current between these electric valves.

To energize the control members 12 and 17 of electric valves 9 and 13, respectively, and hence to render the electric valve means 9 and 13 conductive, I provide control circuits 19 and 20 which are associated with electric valves 9 and 13, respectively. Control circuits 19 and 20 include capacitances 21 and 22 which are charged from the direct current circuit 5 through resistances 23 and 24, and also include control electronic discharge devices 25 and 26 which effect energization of the control members 12 and 17 by discharging the capacitances 21 and 22. The electronic discharge devices 25 and 26 are preferably of the type called Strobotrons. These electronic discharge devices are of the type employing an ionizable medium and each includes an anode 27, a cathode 28, an inner grid 29 and an outer grid 30. Either of the grids, or both, may be varied in potential with respect to the potential of the cathode to initiate a discharge. Such conduction is initiated when the difference of potential between any two elements exceeds values characteristic of the device, such as those shown in Fig. 3 which is explained more fully hereinafter in connection with the operation of the circuit. Current limiting resistances 31 and 32 may be associated with the grids of electronic discharge devices 25 and 26, respectively. While the electronic discharge devices 25 and 26 are represented as being Strobotrons, it is to be understood that I may, if it is so desired, employ electric valves of the thyratron type. That is, I may employ electric valves using an ionizable medium such as a gas or a vapor and having a filamentary cathode or a mercury pool cathode and a control grid for initiating the establishment of an arc discharge.

I provide a control circuit 33 which operates in accordance with a predetermined controlling influence, such as the voltage of the machine 1, or in accordance with the voltage of circuit 4, to effect control of the energization of the field winding 3. The control circuit 33 serves to control the electronic discharge devices 25 and 26 by impressing on the grids thereof periodic voltages adjustable in phase with respect to each other to control thereby the ratio of the period of conduction to the period of non-conduction of the electric valve 9. In order to produce periodic voltages adjustable in phase in accordance with a predetermined controlling influence, I provide a suitable means, such as a saturable inductive device 34, which comprises a core member 35, primary exciting windings 36 which are connected in series relation with a resistance 37 of relatively large value, secondary windings 38 in which there are induced periodic voltages of peaked wave form and a control winding 39 which is energized by unidirectional current to control the phase displacement between the periodic voltages induced in windings 38. A voltage divider comprising serially connected resistances 40 is energized from the direct current circuit 5, providing a point of intermediate potential for the common connection of secondary windings 38.

To control the energization of the winding 39 in accordance with the voltage of circuit 4, I provide a voltage sensitive circuit 41 comprising a rectifier 42 which may be of the full-wave type and may be energized in accordance with the polyphase voltage of circuit 4. The voltage sensitive circuit 41 also includes a voltage divider 43 which is connected to the output terminals of the rectifier 42 and includes a source of reference voltage 44 which, in the arrangement illustrated, is obtained by connecting a suitable device, such as a glow discharge valve 45 in series relation with a resistance 46 across the direct current circuit 5. Due to the characteristics of the glow discharge valve 45, after an arc discharge has been initiated, the voltage of circuit 44 remains substantially constant and this voltage is compared with a predetermined portion of the voltage appearing across the voltage divider 43 to energize control winding 39.

Certain features of the control circuit for the electric valve translating apparatus, wherein control voltages having a variable phase displacement with respect to each other are employed, are disclosed and broadly claimed in a copending patent application Serial No. 146,441, filed June 4, 1937, of Willem F. Westendorp and which is assigned to the assignee of this application.

The operation of the embodiment of my invention diagrammatically illustrated in Fig. 2 will be explained by considering the system when dynamo-electric machine 1 is operating as an alternating current generator to energize circuit 4 and when the excitation system is operating to maintain the voltage of circuit 4 at a substantially constant value. Unidirectional current is transmitted to the field winding 3 from circuit 5 and the magnitude of this current is controlled by the operation of the electric valve 9 which periodically shunts the resistance 7. The average value of the field current is a function of the ratio of the period of conduction to the period of nonconduction of the electric valve 9. In its operation the electric valve 9 simulates the action of the vibratory contacts of a Tirrill type regulator. The length of the periods of conduction of the electric valve 9 is determined by the times at which the electric valve 13 is rendered conductive. One of the electric valves 9 or 13 will be conductive and current is commutated between the electric valves by rendering the nonconductive valve conductive. If it be assumed that the electric valve 9 is conductive, current is transmitted to the field winding 3 through the electric valve 9. At a predetermined time after the electric valve 9 is rendered conductive, the time being determined by the voltage conditions of circuit 4, electric valve 13 is rendered conductive, thereby rendering electric valve 9 nonconductive due to the transient negative potential impressed on the anode 10 by the operation of the capacitance 18. Electric valve 13 then conducts current until electric valve 9 is again rendered conductive.

The operation of the control electronic discharge devices 25 and 26 may be more fully explained by considering the operating characteristics represented in Fig. 3. The shaded portion represents the region of nonconduction of the discharge devices for various values of outer grid and inner grid voltages. To render the discharge devices conductive, it is necessary to impress upon the control members voltages in accordance with the characteristics shown. In the arrangement of Fig. 2, since the inner grid and the outer grid of the respective discharge devices are at the same potential, it is clear that the discharge devices may be rendered conductive by impressing on these grids a voltage sufficient to initiate a discharge between the grids 29 and 30 and the cathodes 28.

The capacitances 21 and 22 in control circuits 19 and 20 are charged from the direct current circuit 5 and are periodically discharged through the electronic discharge devices 25 and 26 to effect energization of the control members 12 and 17 and to render electric valves 9 and 13 conductive.

Electric valve 9 is rendered conductive at regular intervals and in the arrangement shown, the electric valve 9 is rendered conductive once during every cycle of voltage of circuit 4. The electric valve 13 is rendered conductive at the same frequency as the electric valve 9, but at a variable time relative to the time at which electric valve 9 is rendered conductive. In this manner, the ratio of the period of conduction to the period of nonconduction of the electric valve 9 is controlled and the average current transmitted to the field winding 3 is also controlled.

The saturable inductive device 34 generates in secondary windings 38 periodic voltages of peaked wave form. Since the value of the resistance 37 is relatively large, the current of primary windings 36 is limited principally by resistance and is, therefore, sinusoidal and in phase with the supply voltage. The ampere-turns of the primary windings also vary sinusoidally as shown by curve A of Fig. 4. Curve A, of course, may also represent the voltage impressed across the terminals of the serially connected primary windings 36. Since the core 35 becomes saturated at very low values of flux, the flux remains essentially constant during most of the cycle and merely changes its potential at the time when the magnetomotive force reverses. Curve B represents the flux in the core member 35. The only time that voltage is induced in the secondary windings 38 is at those points where the flux is changing, thereby inducing in the secondary windings 38 voltages of peaked wave form as illustrated by curves C. When there is no unidirectional flux in the core member 35, the voltages of peaked wave form are spaced evenly with respect to each other and occur at 180 electrical degree intervals.

When there is direct current flowing in the control winding 39, the primary ampere-turns must rise to a value equal to the ampere-turns of the control winding 39 before the flux reverses direction. In Diagram II of Fig. 4, it will be noted that where positive unidirectional current is transmitted through the control winding 39 establishing a unidirectional magnetomotive force, as indicated by line D, the voltages of peaked wave form are moved closer together as represented by curves E and F. When a negative unidirectional current is transmitted to the control winding 39 establishing a unidirectional magnetomotive force, as indicated by line G, it will be noted that the voltages are displaced by a greater interval as represented by curves E and F of Diagram III of Fig. 4.

It will be observed that the phase displacement between the voltages of peaked wave form induced in windings 38 of device 34 varies in accordance with the direction of the current transmitted to control winding 39 and the phase displacement, therefore, varies in accordance with the magnitude of the voltage of circuit 4. Furthermore, the period of conduction of the electric valve 9 also varies in accordance with the relative phase displacement between the voltages of peaked wave form induced in windings 38. The adjustable contact of voltage divider 43 connected across rectifier 42 is adjusted so that at the desired voltage of circuit 4, there is substantially no unidirectional current transmitted to winding 39, the voltage derived from the voltage divider 43 being substantially equal and in opposition to that produced by circuit 44. So long as the voltage of circuit 4 remains at the desired value, the electric valve 9 is rendered conductive periodically and conducts current for an interval of time equal to that represented by the interval a. Electric valve 9 is rendered nonconductive when the electric valve 13 is rendered conductive.

If it be assumed that the voltage of circuit 4 rises above the value to be maintained, the voltage appearing across the voltage divider 43 increases proportionally, transmitting to the control winding 39 of device 34 a resultant unidirectional current such as that represented in Diagram II of Fig. 4. Under this condition, the electric valve 9 is rendered conductive by the voltages as represented by curves E, and the electric valve 13 is rendered conductive by the voltages as represented by curves F. It is observed that the electric valve 9 conducts current only during the intervals b which are substantially less than the intervals a, thereby effecting a reduction in the average current transmitted to field winding 3 and tending to restore the voltage to the predetermined value. If it be assumed that the voltage of circuit 4 decreases, the conditions shown in Diagram III of Fig. 4 prevail and the electric valve 9 conducts current during intervals c. It will be noted that the intervals c are substantially greater than the intervals a, and the average current transmitted to field winding 3 will be substantially increased, thereby tending to raise the voltage to the desired value to be maintained.

Another important feature of my invention is the advantage obtained by virtue of the rapidity of response of the system upon sudden application of load. When load is suddenly applied to circuit 4, electric valve 9 cannot be commutated by the electric valve 13 during the existence of the field transient which is caused by the sudden application of load. As a result, the electric valve 9 conducts current effecting an increase in the average value of the current transmitted to the field winding 3. Of course, after the field transient has subsided, electric valve 9 is commutated by the electric valve 13 and the ratio of the period of conduction to the period of nonconduction of the electric valve 9 is controlled in accordance with the voltage of circuit 4 to maintain the voltage constant. This consequent increase in the energization of the field winding 3 during the transient period affords distinct advantages where it is desired to obtain a quick response to load conditions.

The embodiment of my invention diagrammatically illustrated in Fig. 5 is similar in many respects to that shown in Fig. 2 and corresponding elements have been assigned like reference numerals. Instead of employing electric valves of the type having immersion-ignitor control members, electric valves 47 and 48 are illustrated in Fig. 5 as valves being provided with control members 49 and 50 of the starting band type. When a sufficiently large voltage having a predetermined minimum rate of change is impressed upon the control members, the electric valves 47 and 48 are rendered conductive. The functions of the electric valves 47 and 48, so far as the operation of the excitation system is concerned, are exactly the same as those of the electric valves 9 and 13 of the arrangement of Fig. 2. Transformers 51 and 52, which are energized by electronic discharge devices 25 and 26, impress suitable voltages across the control members 49 and 50 and the associated cathodes.

I provide an inductive device 53 having a saturated core member 54, a primary winding 55 which is energized from the alternating current circuit 4 through a resistance 56, secondary windings 57 and 58 in which there are induced periodic voltages of peaked wave form, and a control winding 59 which is connected in circuit with voltage divider 43 and circuit 44 through a current limiting inductance 60. The voltages of peaked wave form generated by windings 57 and 58 are impressed upon the outer grids 30 of electronic discharge devices 25 and 26 and serve to render the discharge devices conductive at the times determined by these voltages. Voltage dividers including resistances 61 and 62 are associated with electronic discharge devices 25 and 26 and impress on the inner grids 29 voltages of a magnitude suitable to minimize the possibility of the discharge devices operating under glow discharge conditions.

The arrangement of Fig. 5 also operates to control the excitation of machine 1 to control an electrical condition such as the output voltage of the machine. The electric valve 47 conducts current periodically to shunt the resistance 7 and to control the average value of the current transmitted to winding 3. The electric valve 48 is rendered conductive at the same frequency as the electric valve 47 but at variable times with respect to the time of initiation of the arc discharges in electric valve 47 to control the ratio of the period of conduction to the period of nonconduction of valve 47. The saturable inductive device 53 impresses voltages of peaked wave from on the outer grids 30 of electronic discharge devices 25 and 26 to effect periodic discharge of capacitances 21 and 22, respectively, and to energize thereby the control members 49 and 50 through transformers 51 and 52.

The manner in which the electronic discharge devices 25 and 26 are rendered conductive may be more fully explained by referring to the operating characteristics shown in Fig. 3. It will be noted that if the anode voltage of the electronic discharge devices 25 and 26 rises to nearly 250 volts, the inner grid voltage will be approximately 80 volts positive, and it will require an outer grid voltage of minus 30 volts or positive 180 volts to render the discharge devices conductive. In the arrangement shown, the discharge devices 25 and 26 may be rendered conductive by utilizing the negative peaks of voltage produced by windings 57 and 58.

Fig. 6 diagrammatically illustrates another embodiment of my invention which is similar in several respects to the arrangements shown in Figs. 2 and 5, and corresponding elements have been assigned like reference numerals. To periodically short circuit the resistance 7, I provide an electric valve 63 which may be of the type employing an ionizable medium and having an anode 64, a cathode of the thermionic type 65 and a control member 66. To render the electric valve 63 nonconductive, I employ an electric valve 67 which may be of the same general type as electric valve 63 and which is provided with a control member 68. The electric valve 67 cooperates with the capacitance 18 to effect commutation of current from electric valve 63, and, of course, the capacitance 18 also cooperates with the electric valve 63 to commutate current from electric valve 67 to electric valve 63.

In order to render the electric valve 67 conductive at the same frequency at which electric valve 63 operates and at variable times with respect to the initiation of discharges in electric valve 63, I provide a circuit 69 which generates a periodic voltage. The circuit 69 comprises a capacitance 70 which is charged from the direct current circuit 5 through a resistance 71 and an inductance 72. To periodically discharge the capacitance 70, I provide an electronic discharge device 73 having a control grid 74. The periodic voltage which is generated by circuit 69 is impressed on control member 68 of valve 67 through a suitable impedance element, such as a resistance 75, and through a current limiting resistance 76.

To control the time at which the electric valve 67 is rendered conductive relative to the time at which electric valve 63 is rendered conductive and in accordance with the electrical condition to be regulated, such as the voltage of circuit 4, I provide a circuit 77 which transmits variable amounts of unidirectional current through resistance 75 and hence superimposes a unidirectional biasing potential on the periodic voltage generated by the circuit 69. Circuit 77 may include an electric valve 78, preferably of the high vacuum type, having a suppressor grid 79 connected to the cathode, shield grid 80 which is maintained at a suitable potential by means of a voltage divider including resistances 81, and a control grid 82 which is energized in accordance with the resultant voltage produced by the voltage divider 43 and the glow discharge valve 45. A resistance 83 may be connected between voltage divider 43 and glow discharge valve 45.

To render the electric valve 63 and the electronic discharge device 73 conductive at the same time, I employ any suitable arrangement, such as a transformer 84, which may be of the self-saturating type to produce a periodic voltage of peaked wave form. One terminal of secondary winding 85 of transformer 84 is connected to control member 66 and grid 74 of electric valve 63 and discharge device 73, through current limiting resistances 86 and 87 respectively. The other terminal of secondary winding 85 is maintained at a proper potential by means of a voltage divider including resistances 88. A capacitance 89 may be connected across the voltage divider including resistances 88 and the glow discharge valve 45. A resistance 90 may be connected in series relation with the primary winding of transformer 84 so that the transformer 84 operates as a resistance voltage peaking device.

The general principles of operation of the arrangement shown in Fig. 6 are substantially the same as those explained above in connection with Figs. 2 and 5. That is, the electric valve 63 periodically short circuits the resistance 7 to control the average current transmitted to field winding 3. The electric valve 67 renders electric valve 63 nonconductive and hence controls the periods of conduction of electric valve 63. The electric valve 67 is rendered conductive at variable times with respect to the electric valve 63 and in accordance with the voltage of circuit 4. Electric valve 63 and discharge device 73 are rendered conductive simultaneously by means of the peaked voltage generated by transformer 84. Circuit 69 generates a periodic voltage which is impressed on control member 68 of electric valve 67, and circuit 77 transmits variable amounts of unidirectional current through resistance 75 to control the unidirectional voltage impressed on control member 68 and hence to control the time at which the valve 67 is rendered conductive. The adjustable contact of the voltage divider 43 is positioned so that at the desired voltage of circuit 4, the potential of control grid 82 is substantially that of the cathode of valve 78.

A better understanding of the operation of the arrangement of Fig. 6 may be had by referring to the operating characteristics shown in Fig. 7. Electric valve 63 and discharge device 73 are rendered conductive at times $d$, $e$ and $f$, and curve H represents the periodic voltage generated by circuit 69 and which is impressed on control member 68. The positive peaks of voltage generated by transformer 84 are represented by curves J. The electric valve 63 conducts current as represented by spaces K when the unidirectional voltage produced by resistance 75 and circuit 77 attains a value as represented by line L. Of course, electric valve 67 is rendered conductive at times $g$ and $h$. If it be assumed that the voltage of circuit 4 decreases to a value below that which it is desired to maintain, the resultant voltage impressed on control grid 82 of valve 78 will be raised in potential with respect to the cathode, delaying the time at which the valve 67 is rendered conductive so that valve 67 is rendered conductive at times $j$ and $k$. The value of the negative unidirectional biasing potential produced by resistance 75 and circuit 77 will then be represented by curve M. In this manner, the period of conduction of electric valve 63 will be increased in length and may be represented by spaces N. In a similar manner, the circuit will respond to decrease the length of the periods of conduction of valves 63 when the voltage of circuit 64 rises above the desired value, thereby maintaining the voltage of circuit 4 substantially constant.

Fig. 8 diagrammatically illustrates an improved control circuit for controlling saturable inductive devices. The arrangement of Fig. 8 may be applied to the general system disclosed in Fig. 2 and corresponding elements have been assigned like reference numerals. A saturable inductive device 91, having a magnetically saturable core member 92, is provided with a primary winding 93, secondary windings 94 and 95 in which there are induced periodic voltages of peaked wave form, and control windings 96 and 97. The primary winding 93 is energized from an alternating current circuit, such as circuit 4, through a resistance 98 so that the current of primary winding 93 is substantially in phase with the voltage.

The control circuit shown in Fig. 8 is claimed in my copending divisional patent application Serial No. 259,143, filed March 1, 1939, and which is assigned to the assignee of this application.

Control winding 96 is energized by a substantially constant unidirectional current and impresses on the core member 92 a constant unidirectional magnetomotive force. This constant current may be obtained by utilizing the voltage appearing across the glow discharge 45, and an adjustable resistance 99 and a serially connected inductance 100 may be connected in series relation with the control winding 96. The magnetomotive forces produced by control windings 96 and 97 are in opposition. Control winding 97 is variably energized to control the phase displacement between the peaks of the voltages induced in windings 94 and 95. Windings 94 and 95 may be connected to grids 29 and 30 of electronic discharge devices 25 and 26 in the arrangement of Fig. 6. An adjustable resistance 101 and an inductance 102 may be connected in series relation with the control winding 97.

In order to variably energize the control winding 97 and to control thereby the resultant unidirectional magnetomotive force impressed on core member 92, I provide an electric valve 103, preferably of the high vacuum type, having an anode 104, a cathode 105, a filamentary heating element 106 and which may have a grid 107 which may be connected to the anode through a current limiting resistance 108. The heating element 106 is variably energized in accordance with a predetermined controlling influence, such as the voltage of circuit 4, to control the current transmitted by the valve 103 and hence to control the phase displacement between the peaks of the voltages induced in windings 94 and 95. A transformer 109 may be connected to circuit 4 so that the energization of the heating element 106 is varied in accordance with the voltage of circuit 4. A variable impedance, such as an adjustable resistance 110, may be connected in series relation with the primary winding of transformer 109.

The arrangement of Fig. 8 functions to control the phase displacement between the peaks of the periodic voltages induced in windings 94 and 95 in accordance with the voltage of circuit 4. Control winding 96 impresses a constant unidirectional magnetomotive force on the core member 92 and control winding 97 impresses an opposing variable unidirectional magnetomotive force on the core member to control the resultant unidirectional flux in the core member. The value of the constant current supplied to control winding 96 is adjusted to shift the peaks of the voltages induced in the secondary windings to a minimum phase displacement limit for raising the voltage of circuit 4. The current transmitted by the control winding 97, since it opposes the effect of winding 96, tends to increase the phase displacement between the peaks of the voltages induced in the secondary windings 94 and 95. Due to the fact that a constant current is supplied to the control winding 96 and due to the fact that the electric valve 103 can conduct current in only one direction, there is provided an arrangement for limiting the minimum phase displacement between the peaks of the voltages induced in windings 94 and 95.

Electric valve 103 conducts variable amounts of current in accordance with the voltage of circuit 4 by utilizing the cathode temperature-anode current characteristics of the electric valve. The electric valve 103 is operated within the saturated region so that the amount of current transmitted thereby varies in accordance with the cathode temperature. As the voltage of circuit 4 tends to rise, the electric valve 103 conducts a greater amount of current, effecting an increase in phase displacement between the peaks of the voltages produced by windings 94 and 95. In like manner, a decrease in voltage of circuit 4 will cause electric valve 103 to conduct a smaller amount of current, thereby decreasing the phase displacement between the peaks of the voltages induced in windings 94 and 95.

The curves T1—T6 of Fig. 9 represent the operating characteristics of the electric valve 103 for a variety of different filament temperatures. It will be noted that the current transmitted by the electric valve 103 is limited to a maximum value established by the filament temperature-anode current characteristics of the valve and the value of the resistance 101 which is connected in series relation with the valve. Therefore, for a fixed value of voltage of circuit 5, the range of shift of the phase displacement between the peaks of the voltages induced in windings 94 and 95 is limited.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a load circuit, a source of current for energizing said load circuit, a resistance for controlling the current transmitted through said load circuit, electric valve means connected across said resistance for periodically shunting said resistance, said electric valve means having a control member, the load current being a function of the ratio of the period of conduction to the period of nonconduction of said electric valve means, means for rendering said electric valve means nonconductive comprising a commutating means and a second electric valve means, said second electric valve means having a control member, and means responsive to a predetermined controlling influence derived from said load circuit for impressing on said control members periodic voltages of variable phase displacement with respect to each other.

2. In combination, a load circuit, a source of current for energizing said load circuit, a resistance for controlling the current transmitted through said load circuit, electric valve means connected across said resistance for periodically shunting said resistance, said electric valve means having a control member, the load current being a function of the ratio of the period of conduction to the period of nonconduction of said electric valve means, means for rendering said electric valve means nonconductive comprising a commutating means and a second electric valve means, said second electric valve means having a control member, means for energizing the control members of said electric valve means comprising a saturable inductive device for producing periodic voltages, and means responsive to the voltage of said load circuit for controlling the relative phase displacement between said periodic voltages.

3. In combination, a source of current, a load circuit, a resistance connected in series relation with said load circuit, electric valve means connected across said resistance and having a control member, means for energizing said control member to render said electric valve means conductive comprising an electronic discharge device having a control grid, means for rendering said electric valve means nonconductive comprising a second electric valve means having a control member, a second electronic discharge device for energizing the control member of said second electric valve means and being provided with a grid, and means for impressing on the grids of said electronic discharge devices periodic voltages variable in phase with respect to each other.

4. In combination, a source of current, a load circuit, a resistance connected in series relation with said load circuit, electric valve means connected across said resistance and having a control member, means for energizing said control member to render said electric valve means conductive comprising an electronic discharge device having a control grid, means for rendering said electric valve means nonconductive comprising a second electric valve means having a control member, a second electronic discharge device for energizing the control member of said second electric valve means and being provided with a grid, a saturable inductive device for impressing periodic voltages of peaked wave form on the grids, and means for controlling said inductive device to control the phase displacement between said periodic voltages in accordance with a predetermined electrical quantity of said control circuit.

5. In combination, a source of direct current, a load circuit, a resistance for controlling the current transmitted through said load circuit, electric valve means connected across said resistance and having a control member for rendering said electric valve means conductive, means for rendering said electric valve means nonconductive comprising a second electric valve means and a capacitance connected between the first mentioned electric valve means and the second electric valve means, said second electric valve means having a control member, and means for impressing on the control members periodic voltages variable in phase with respect to each other.

6. In combination, an alternating current circuit, a load circuit, a source of direct current for energizing said load circuit, a resistance connected in series relation with said load circuit, electric valve means connected across said resistance for periodically shunting said resistance, said electric valve means having a control member for rendering said electric valve means conductive, means for rendering said electric valve means nonconductive comprising a second electric valve means and a capacitance connected between the first mentioned electric valve means and the second electric valve means, said second electric valve means having a control member, a saturable inductive device for impressing on the control members periodic voltages of peaked wave form, and means for controlling said inductive device to control the phase displacement between said periodic voltages in accordance with the voltage of said alternating current circuit and comprising a source of reference voltage, a rectifier energized from said alternating current circuit and a voltage divider connected across said rectifier.

7. In combination, a source of direct current, a load circuit, translating apparatus connected between said circuits for transmitting energy therebetween and comprising a resistance, an electric valve means connected across said resistance and comprising a control member for rendering the electric valve means conductive, a second electric valve means having a control member, a capacitance connected between the electric valve means for effecting commutation of current therebetween, a pair of electronic discharge devices each associated with a different one of the control members for effecting energization thereof, said electronic discharge devices each being provided with a control grid for rendering the discharge devices conductive, and means for impressing on the control grids periodic voltages variable in phase with respect to each other to control the energization of said load circuit.

8. In combination, a source of direct current, electric valve means having a control member and being connected to be energized from the direct current source, means for impressing on said control member a periodic voltage comprising a capacitance connected to be charged from said source and an electronic discharge device for periodically discharging said capacitance, an impedance element connected in circuit with said control member, and a second electronic discharge device for discharging said capacitance through said impedance element to impress on said control member a unidirectional potential to control the time at which said electric valve means is rendered conductive.

9. In combination, a source of direct current, a load circuit, means for controlling the energization of said load circuit from the direct current source and comprising an electric valve means having a control member, means for commutating the current from said electric valve means comprising a second electric valve means and a capacitance which is connected between the first mentioned and said second electric valve means, said second electric valve means being provided with a control member, means for impressing on the control member of the first mentioned electric valve means a voltage to render said electric valve means conductive periodically, means for impressing on the control member of said second electric valve means a periodic voltage comprising a capacitance connected to be charged from said direct current source and an electronic discharge device for periodically discharging the second mentioned capacitance, and means for impressing on the control member of said second electric valve means a unidirectional voltage to control the time at which said second electric valve means is rendered conductive.

10. In combination, a source of direct current, a load circuit connected to be energized from said source, an electric valve means having a control member for controlling the energization of said load circuit, the energization of said load circuit being proportional to the ratio of the period of conduction to the period of nonconduction of said electric valve means, and means for controlling the period of conduction of said electric valve means in accordance with a predetermined controlling influence comprising a second electric valve means and a capacitance for commutating current from said first mentioned electric valve means, said second electric valve means having a control member, means for generating a periodic voltage of a frequency equal to the frequency at which the first mentioned electric valve means is rendered conductive, means for impressing on the control member of said second electric valve means a unidirectional voltage and means responsive to said predetermined controlling influence for controlling the magnitude of said unidirectional voltage.

EVAN A. EDWARDS.